United States Patent
Lee et al.

(10) Patent No.: US 8,855,339 B2
(45) Date of Patent: Oct. 7, 2014

(54) ELECTRET LOUDSPEAKER DEVICE

(75) Inventors: Chih-Kung Lee, Taipei (TW); Yu-Chi Chen, Taipei (TW); Han-Lung Chen, Taipei (TW); Hsu-Ching Liao, Taipei (TW); Wen-Hsin Hsiao, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 13/587,910

(22) Filed: Aug. 16, 2012

(65) Prior Publication Data

US 2013/0044906 A1 Feb. 21, 2013

(30) Foreign Application Priority Data

Aug. 18, 2011 (TW) .............................. 100129490 A
Jul. 18, 2012 (TW) .............................. 101125872 A

(51) Int. Cl.
*H04R 19/01* (2006.01)
*B32B 37/02* (2006.01)
*H04R 7/10* (2006.01)

(52) U.S. Cl.
CPC .............. *B32B 37/02* (2013.01); *B32B 2327/18* (2013.01); *H04R 19/013* (2013.01); *H04R 7/10* (2013.01); *B32B 2457/00* (2013.01); *B32B 2323/04* (2013.01)
USPC ............................ 381/191; 381/189; 381/150

(58) Field of Classification Search
USPC .............. 381/150, 174, 189–191; 156/273.5; 361/371, 283.1, 283.4
See application file for complete search history.

(56) References Cited

U.S. PATENT DOCUMENTS

| | | | | |
|---|---|---|---|---|
| 8,139,794 | B2* | 3/2012 | Chen et al. | 381/150 |
| 8,202,608 | B2* | 6/2012 | Cowell Senft et al. | 428/212 |
| 2007/0003081 | A1* | 1/2007 | Ram et al. | 381/191 |
| 2011/0075868 | A1* | 3/2011 | Takano | 381/191 |
| 2012/0002826 | A1* | 1/2012 | Wu et al. | 381/191 |
| 2012/0051564 | A1* | 3/2012 | Liou et al. | 381/191 |

* cited by examiner

*Primary Examiner* — Ahmad Matar
*Assistant Examiner* — Sabrina Diaz
(74) *Attorney, Agent, or Firm* — Jianq Chyun IP Office

(57) ABSTRACT

An electret loudspeaker device including a diaphragm, a first perforated electrode and a first spacer is provided. The diaphragm includes a first electret, a second electret, a polymer layer and an electrode layer. At least one layer of the first electret or the second electret is formed by expanded polytetrafluoroethylene. The second electret is stacked on one side of the first electret, while the electrode layer is stacked on the opposite side of the first electret. The polymer layer is made of a hydrophobic material and is disposed on the second electret. The first perforated electrode is stacked on a first spacer and close to the polymer layer. The first spacer disposed between the diaphragm and the first perforated electrode supports the first perforated electrode over the diaphragm and defines a first chamber. A fabrication method of the electret loudspeaker device is also provided.

13 Claims, 6 Drawing Sheets

ELECTRET LOUDSPEAKER DEVICE

CROSS-REFERENCE TO RELATED APPLICATION

This application claims the priority benefits of Taiwan application serial no. 100129490, filed on Aug. 18, 2011, and Taiwan application serial no. 101125872, filed on Jul. 18, 2012. The entirety of each of the above-mentioned patent applications is hereby incorporated by reference herein and made a part of specification.

BACKGROUND OF THE INVENTION

1. Field of the Invention

The present invention relates to an electret loudspeaker device. More particularly, the present invention relates to a material of an electret diaphragm for an electret loudspeaker device and the fabrication method thereof.

2. Description of Related Art

The electret loudspeaker device operates in a vibrating mode of the electret diaphragm to produce the sound, by varying the electrostatic force of the electret diaphragm and through interaction between the applied voltage from the acoustic waves and electric charges of the electret diaphragm. One of the commonly used materials for the electret diaphragm may be expanded polytetrafluoroethylene (ePTFE) material, for example. The ePTFE membrane is a porous membrane formed by unidirectionally mechanical stretched polytetrafluoroethylene (PTFE), which is white, flexible and tensile and has a meshed structure formed from connected minute fibers and with numerous pores. Based on research studies, the high contact area of these pores allows the ePTFE membrane to store more electric charges and have higher electret property. However, the electret property of the ePTFE electret diaphragm swiftly decreased when encountering environmental humidity or high temperature, which significantly deteriorates the sound generating capability of the electret loudspeaker device. Hence, the stability of the electret loudspeaker device using the ePTFE electret diaphragm turns out to be unacceptable. Accordingly, it is desirable to develop the electret loudspeaker device tolerant to humidity and high temperature.

SUMMARY OF THE INVENTION

The present invention related to a electret loudspeaker device, which has tolerance toward humidity and high temperature.

The present invention provides an electret loudspeaker device, including a diaphragm, a first perforated electrode and a first spacer. The diaphragm comprises a first electret, a second electret, a polymer layer and an electrode layer. At least one layer of the first electret or the second electret is formed by expanded polytetrafluoroethylene. The second electret is stacked on one side of the first electret, while the electrode layer is stacked on the opposite side of the first electret. The polymer layer is made of a hydrophobic material. The second electret is sandwiched between the first electret and the polymer layer, and the first electret is sandwiched between the electrode layer and the second electret. The first perforated electrode is stacked on a first spacer and close to the polymer layer of the diaphragm. The first spacer is made of an insulating material and disposed between the diaphragm and the first perforated electrode supports the first perforated electrode over the diaphragm and defines a first chamber. A fabrication method of the electret loudspeaker device is also provided.

The present invention provides a fabrication method of an electret loudspeaker device, comprises providing a first electret material diaphragm and disposing an electrode layer on one side of the first electret material diaphragm. The first electret material diaphragm having the electrode layer disposed thereon is poled to form the first electret. A second electret material diaphragm is disposed on one side of the first electret that is opposite to the electrode layer via electrostatic force. The first electret having the second electret material diaphragm adhered thereon is poled again, so that the poled second electret material diaphragm becomes the second electret. The electrode layer, the first electret and the second electret constitute an electret composite film. A polymer layer is disposed on one side of the electret composite film that is opposite to the first electret. The polymer layer is adhered to the second electret via electrostatic force. The electret composite film having the polymer layer stacked thereon is poled again to form a diaphragm. Lastly, a first spacer and a first perforated electrode are disposed on the polymer layer of the diaphragm.

As embodied and broadly described herein, the first electret is an expanded polytetrafluoroethylene membrane, while the second electret is a solid electret.

As embodied and broadly described herein, the electret loudspeaker device further comprises two terminal electrodes. The two terminal electrodes are respectively electrically connected to the first perforated electrode and the diaphragm, and are electrically connected to an external signal.

In one embodiment, the electret loudspeaker device further comprises a supporter and a protector. The supporter is stacked on the first perforated electrode. The protector includes a first surface protective layer and a plurality of side protective layers. The first surface protective layer is stacked on the supporter and covers the first perforated electrode, the side protective layers are disposed on sides of the electret loudspeaker device, and the outer surface of the first surface protective layer is hydrophobic.

In another embodiment, the electret loudspeaker device further comprises a second perforated electrode stacked close to the electrode layer of the diaphragm and a third spacer. The third spacer is disposed between the diaphragm and the second perforated electrode and supports the second perforated electrode over the diaphragm to define at least a second chamber. The electret loudspeaker device also includes a plurality of supporters respectively stacked on the first perforated electrode and the second perforated electrode and a protector. The protector includes a first surface protective layer, a second surface protective layer and a plurality of side protective layers. The first surface protective layer and the second surface protective layer respectively are stacked on the supporters and cover the first perforated electrode and the second perforated electrode. The side protective layers are disposed on sides of the electret loudspeaker device. The first surface protective layer, the second surface protective layer and the side protective layers are made of hydrophobic materials. The two terminal electrodes are respectively electrically connected to two of the first perforated electrode, the second perforated electrode and the diaphragm.

As embodied and broadly described herein, the electret loudspeaker device further comprises at least one insulative fixture penetrating the first spacer and the diaphragm.

As embodied and broadly described herein, materials of the first electret and the second electret comprise at least one of polypropylene, polystyrene, polycarbonate, polyvinyl chloride, polymethylmethacrylate, cyclic olefin copolymers, polytetrafluoroethylene, expanded polytetrafluoroethylene (ePTFE), fluorinated ethylene propylene and the combinations thereof.

As embodied and broadly described herein, a material of the polymer layer comprises at least one of polypropylene, polyethylene, poly ethylene terephthalate, polyvinyl chloride and the combinations thereof.

As embodied and broadly described herein, the fabrication method of the electret loudspeaker device further comprises disposing a third electret material diaphragm on the electret composite film via electrostatic force and poling the electret composite film with the third electret material diaphragm thereon, so that the third electret material diaphragm becomes a third electret, after the step of poling the first electret having the second electret material diaphragm adhered thereon. These steps may be repeated several times until the desirable layers are obtained.

For the electret loudspeaker device of this invention, by laminating several layers of electrets and the polymer layer made of a hydrophobic material on the diaphragm, moisture invasion into the diaphragm can be avoided and the performance of the electret diaphragm of the electret loudspeaker device will not be affected. In addition, making use of electrostatic force to adhere layers in the fabrication of the electret composite diaphragm makes three fabrication processsimplified. Further, as the electret property of the electret diaphragm is enhanced by performing one poling process after the lamination of each layer, the electret loudspeaker device can be operated properly even under the environment of high temperature and high humidity.

In order to make the aforementioned and other objects, features and advantages of the present invention comprehensible, embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention is described below in detail with reference to the accompanying drawings, and the embodiments of the present invention are shown in the accompanying drawings. However, the present invention can also be implemented in a plurality of different forms, so it should not be interpreted as being limited in the following embodiments. Actually, the following embodiments are intended to demonstrate and illustrate the present invention in a more detailed and completed way, and to fully convey the scope of the present invention to those of ordinary skill in the art. In the accompanying drawings, in order to be specific, the size and relative size of each layer and each region may be exaggeratedly depicted.

Figure 1A:
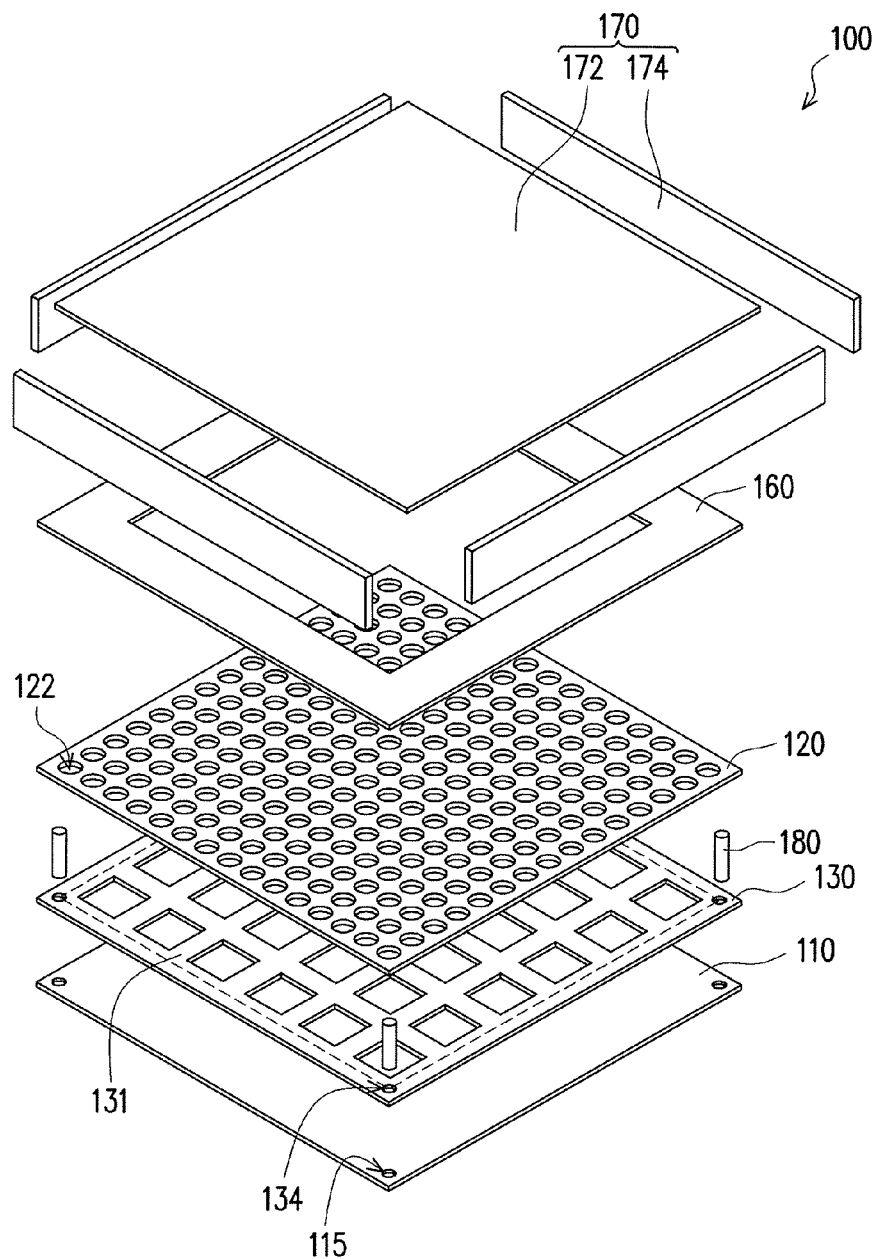
FIG. 1A is an explosive view of an electret loudspeaker device according to one embodiment of this disclosure.
Figure 1B:
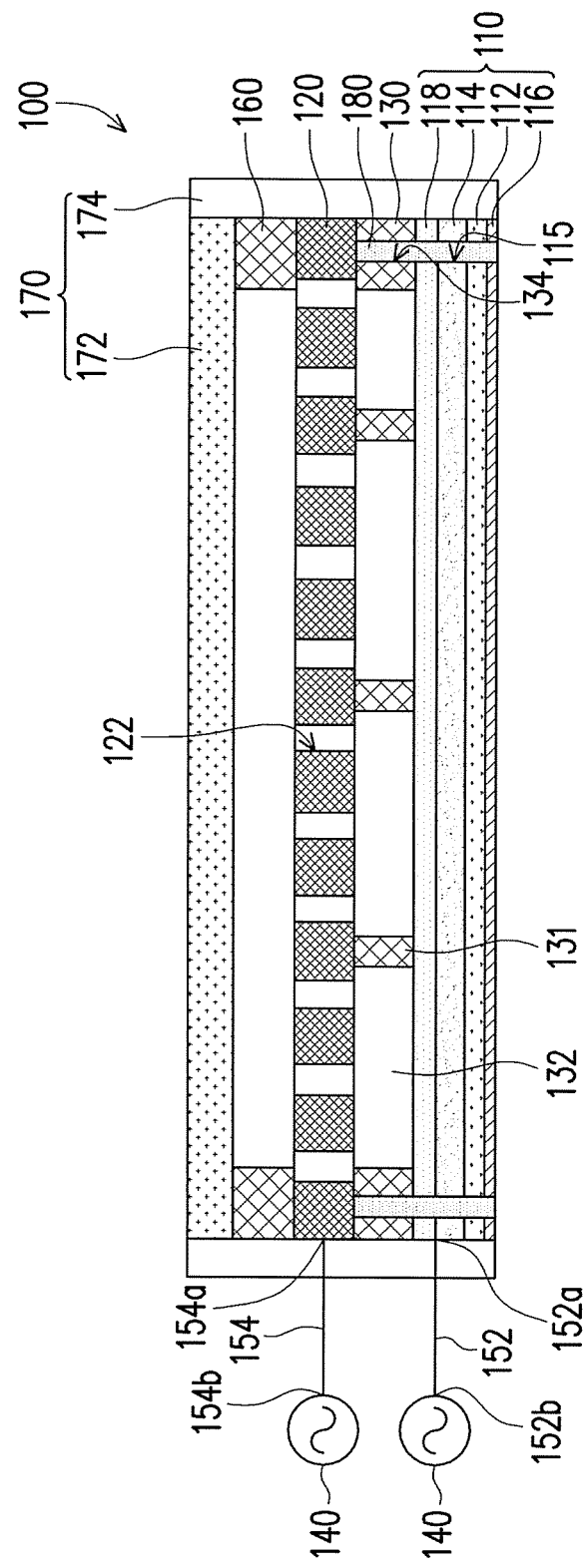
FIG. 1B is a cross-sectional view of the electret loudspeaker device of FIG. 1A in the stacked state and connected to the external signals.
Figure 1C:
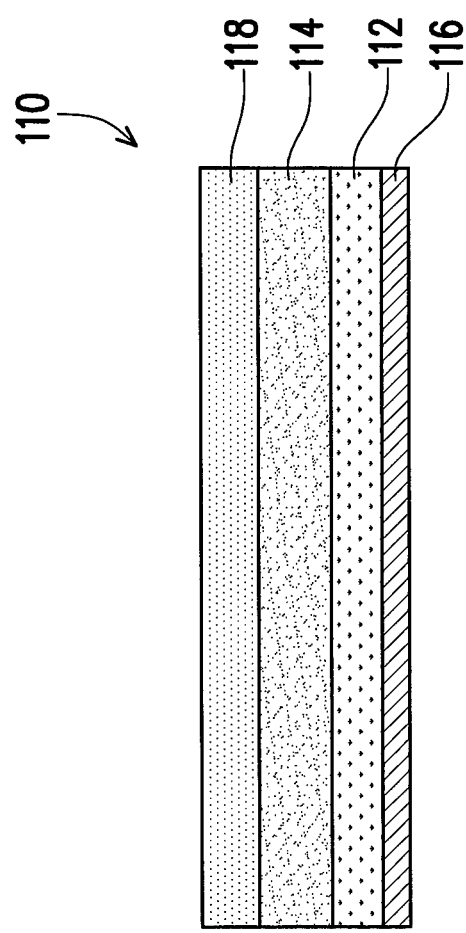
FIG. 1C is a side view of a diaphragm of the electret loudspeaker device of FIG. 1A.

FIG. 1A is an explosive view of an electret loudspeaker device according to one embodiment of this disclosure. FIG. 1B is a cross-sectional view of the electret loudspeaker device of FIG. 1A in the stacked state and connected to the external signals. FIG. 1C is a side view of a diaphragm of the electret loudspeaker device of FIG. 1A. Referring to FIGS. 1A-1C, the electret loudspeaker device 100 comprises a diaphragm 110, a first perforated electrode 120 and a first spacer 130. The diaphragm 110 comprises a first electret 112, a second electret 114, an electrode layer 116 and a polymer layer 118. The second electret 114 is stacked on one side of the first electret 112, while the electrode layer 116 is stacked on the opposite side of the first electret 112 (opposite to the second electret 114). The polymer layer 118 is made of a hydrophobic material, for example. The second electret 114 is sandwiched between the polymer layer 118 and the first electret 112, while the first electret 112 is sandwiched between the electrode layer 116 and the second electret 114. The first perforated electrode 120 is stacked on the first spacer 130 and adjacent to the polymer layer 118 of the diaphragm 110, and includes a plurality of pores 122. The first spacer 130 is disposed between the diaphragm 110 and the first perforated electrode 120, and the first spacer 130 made of an insulating material has a grid structure with a plurality of openings. A plurality of the structural rib 131 of the first spacer 130 supports the first perforated electrode 120 over the diaphragm 110 and defines a plurality of first chambers 132 between the diaphragm 110 and the first perforated electrode 120.

In this embodiment, the diaphragm 110 of the electret loudspeaker device 100 includes the polymer layer 118 to prevent moisture invasion into the diaphragm 110, which may deteriorate the acoustic performance of the electret loudspeaker device 100. Hence, the electret loudspeaker device 100 of this invention would have better performance in the humid and high temperature environments.

In this embodiment, the first electret 112 of the diaphragm 110 is an ePTFE membrane, for example. The second electret 114 may be a solid electret, for example. The materials of the above described electrets may be polypropylene (PP), polystyrene (PS), polycarbonate (PC), polyvinyl chloride (PVC), polymethylmethacrylate (PMMA) and cyclic olefin copolymer (COC), as well as flouropolymers, such as, polytetrafluoroethylene (PTFE), ePTFE and fluorinated ethylene propylene (FEP). The combination and material(s) of the first electret 112 and the second electret 114 are not limited by the present embodiment, but at least one of the electrets is made of ePTFE. The first spacer 130 disposed between the diaphragm 110 and the first perforated electrode 120 is an insulative spacer, to electrically isolate the diaphragm 110 and the first perforated electrode 120.

For the electret loudspeaker device 100 of this embodiment, the diaphragm 110 and the first perforated electrode 120 may be electrically connected to an external signal 140 (as shown in FIG. 1B), so as to be driven to generate sounds. In this embodiment, the device further comprises two terminal electrodes 152, 154, and the terminal electrodes 152, 154 respectively have two terminals. The first terminals 152a, 154a of the terminal electrodes 152, 154 are electrically connected to the first perforated electrode 120 and the diaphragm 110 respectively, while the second terminals 152b,154b of the terminal electrodes 152, 154 are electrically connected to the external signal 140.

The electret loudspeaker device 100 of this embodiment is applicable for the humid and high temperature environment because the diaphragm 110 has the polymer layer 118. For better humidity resistance, the electret loudspeaker device 100 of this embodiment further comprises a plurality of supporters 160 and a protector 170. The supporter 160 is stacked on the first perforated electrode 120. The protector 170 comprises a first surface protective layer 172 and side protective layers 174, and the first surface protective layer 172 is stacked on the supporter 160 and covers the first perforated electrode 120. The side protective layers 174 are disposed on the sides of the electret loudspeaker device 100.

The arrangement of the first surface protective layer 172 not only prevents the water vapor from entering the first perforated electrode 120, but also provides extra protection for the electret loudspeaker device 100. The first surface protective layer 172 may be made of a hydrophobic non-woven cloth or a hydrophobic polymer material, such as polypropylene (PP), polyethylene (PE), poly ethylene terephthalate (PET) or polyvinyl chloride (PVC). The side protective layer 174 arranged on the sides of the electret loudspeaker device 100 further prevents the vapor from entering the electret loudspeaker device 100, which improves the reliability of the electret loudspeaker device 100 when operating under the humid and high temperature environment. The side protective layer 174 may be plastic blue tape, for example.

In this embodiment, the electret loudspeaker device 100 further comprises at least one insulative fixture 180 (two are shown in FIG. 1B), and the diaphragm 110 and the first spacer 130 may further include openings 115, 134 for installing the insulative fixtures 180 to fix the first spacer 130 and the diaphragm 110.

Figure 2:
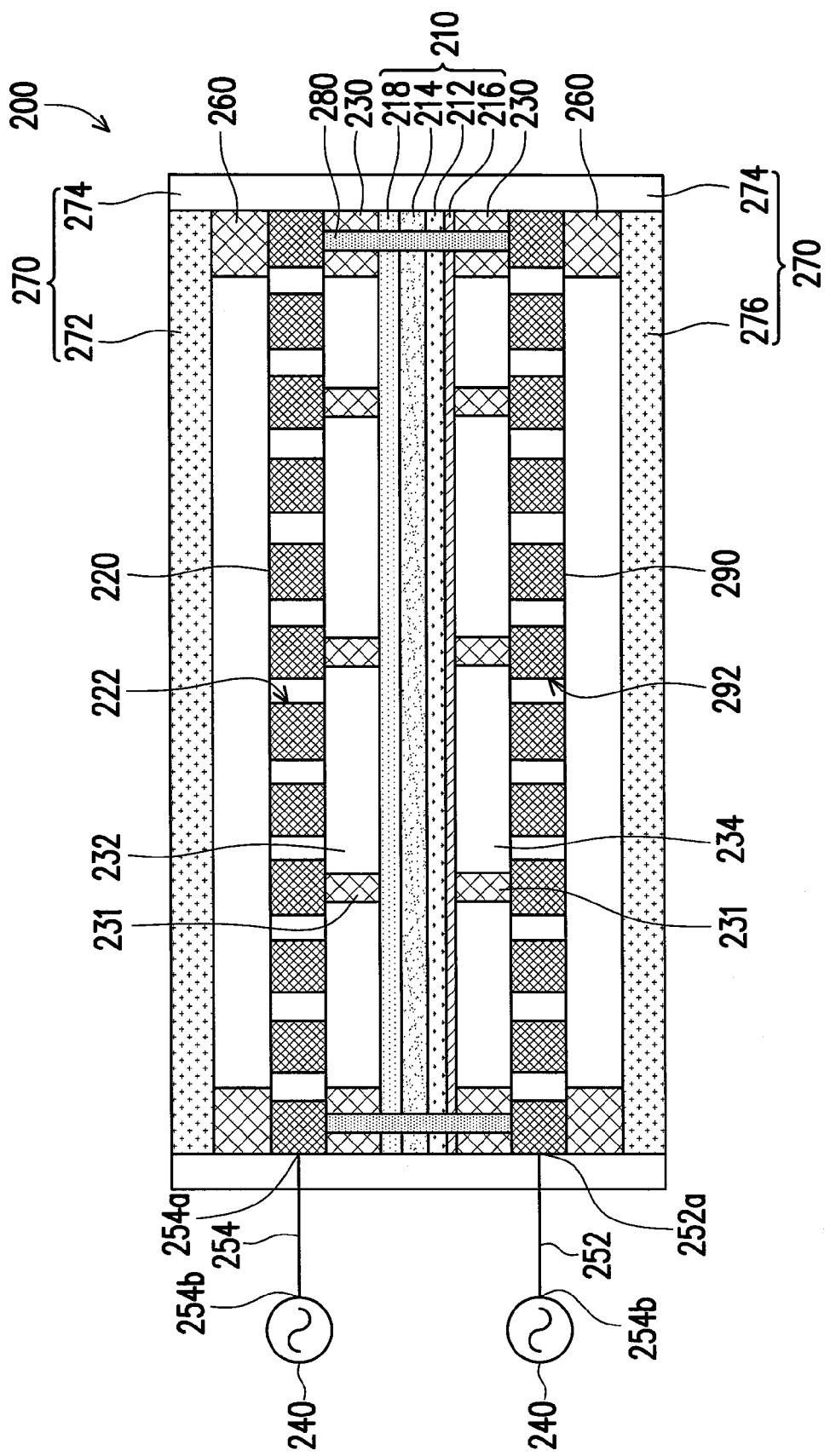
FIG. 2 is a cross-sectional view of an electret loudspeaker device in the stacked state and connected to the external signals according to another embodiment of this disclosure.

FIG. 2 is a cross-sectional view of an electret loudspeaker device in the stacked state and connected to the external signals according to another embodiment of this disclosure. Referring to FIG. 2, the electret loudspeaker device 200 also comprises a diaphragm 210, a first perforated electrode 220 and more than one first spacer 230. The diaphragm 210 comprises a first electret 212, a second electret 214, an electrode layer 216 and a polymer layer 218. The difference between the electret loudspeaker device 200 and the electret loudspeaker device 100 of FIG. 1A lies in that the electret loudspeaker device 100 has one single first perforated electrode 120 and hence is a single-sided driven electret loudspeaker device 100. On the other hand, the electret loudspeaker device 200 of this embodiment further comprises a second perforated electrode 290. The second perforated electrode 290 is stacked on the first spacer 230 and close to the electrode layer 216 of the diaphragm 210. The second perforated electrode 290 and the first perforated electrode 220 both have a plurality of pores 292, 222. The first spacers 230 are disposed between the diaphragm 210 and the first perforated electrode 220 as well as between the diaphragm 210 and the second perforated electrode 290. The structural ribs 230 of the first spacers 230 respectively support the first perforated electrode 220 and the second perforated electrode 290 over the diaphragm 210 to define a plurality of first chambers 232 and second chambers 234.

In this embodiment, the first terminals 252a, 254a of the terminal electrodes 252, 254 are electrically connected to two of the first perforated electrode 220, the second perforated electrode 290 and the diaphragm 210. The second terminals 252b, 254b of the terminal electrodes 252, 254 are electrically connected to the external signal 240.

For the electret loudspeaker device 200 of this embodiment, since the first perforated electrode 220 and the second perforated electrode 290 are disposed at two opposite sides of the diaphragm 210, the electret loudspeaker device 200 is a dual-sided driven electret loudspeaker device. The dual-sided driven electret loudspeaker device has certain advantages. For example, when the terminal electrodes 252, 254 are electrically connected to the first perforated electrode 220 and the second perforated electrode 290, the sound signals and the inverted sound signals are respectively inputted into the first perforated electrode 220 and the second perforated electrode 290 so as to respectively generate the equal amounted attractive and repulsive forces toward the diaphragm 110 in a symmetric way, leading to better efficiency.

Similar to the previous embodiment, the electret loudspeaker device 200 may further comprises a plurality of supporters 260 and protectors 270 to increase the ability of moisture isolation of the electret loudspeaker device 200. The protector 270 includes not only a first surface protective layer 272 and a plurality of side protective layers 274, but also a second surface protective layer 276. The first surface protective layer 272 and the second surface protective layer 276 are respectively stacked on the supporters 260, respectively covering the first perforated electrode 220 and the second perforated electrode 290, while the side protective layers 274 are disposed on the sides of the electret loudspeaker device 200. The first surface protective layer 272, the second surface protective layer 276 and the side protective layers 274 are made of hydrophobic materials.

Basically, the materials of the first surface protective layer 272, the second surface protective layer 276 and the side protective layers 274 are similar or the same as those of the similar elements as described in the previous embodiment and will not be discussed herein in details. In this embodiment, the insulative fixtures 280 are installed between the first perforated electrode 220 and the diaphragm 210, and installed between the second perforated electrode 290 and the diaphragm 210. The details of the fixtures are similar to those described in the previous embodiment and will not be discussed herein in details.

Figure 3:
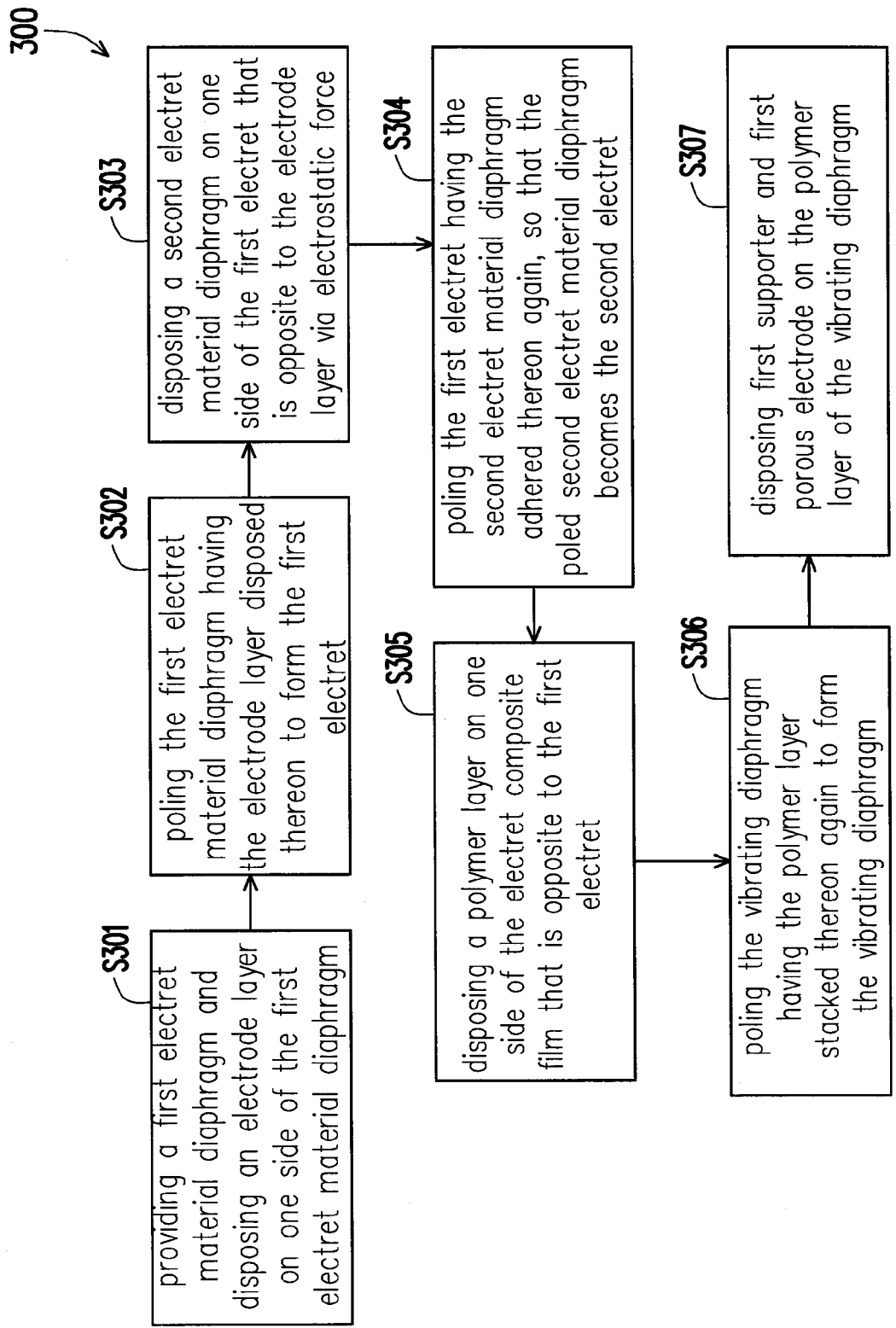
FIG. 3 is a flow chart showing the manufacturing processes for the diaphragm of the electret loudspeaker device of FIG. 1A.

FIG. 3 is a flow chart showing the manufacturing processes for the diaphragm 110 of the electret loudspeaker device 100 of FIG. 1A. Referring to FIG. 3, the present invention provides a fabrication method 300 of the electret loudspeaker device. The fabrication method 300 comprises providing a first electret material diaphragm (such as an ePTFE membrane) and disposing an electrode layer 116 on one side of the first electret material diaphragm (Step S301). In Step S302, the first electret material diaphragm having the electrode layer 116 disposed thereon is poled to form the first electret 112. In Step S303, a second electret material diaphragm (such as a solid electret) is disposed on one side of the first electret 112 that is opposite to the electrode layer 116. In this embodiment, the second electret material diaphragm is adhered to the first electret 112 via electrostatic force, without using other means to fix the second the electret diaphragm to the first electret 112. In Step S304, the first electret 112 having the second electret material diaphragm adhered thereon is poled again, so that the poled second electret material diaphragm becomes the second electret 114. After Step S304, the electrode layer 118, the first electret 112 and the second electret 114 constitute an electret composite film.

Figure 4:
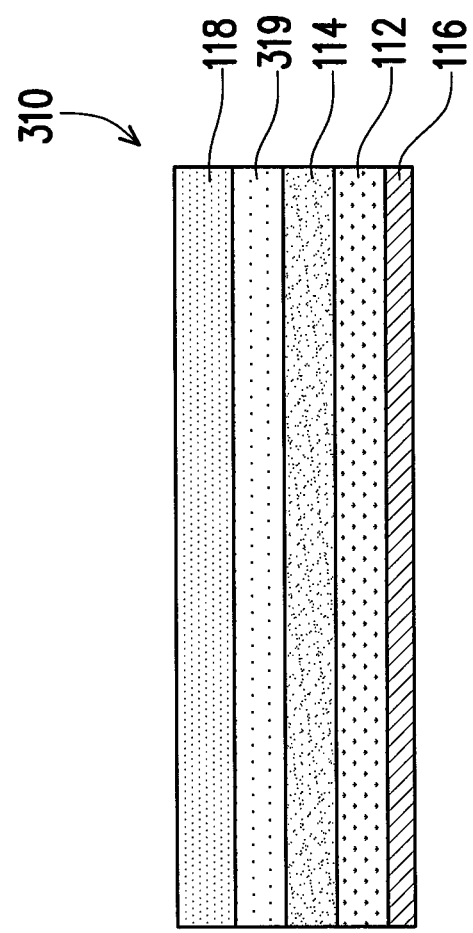
FIG. 4 is a side-view of a diaphragm according to another embodiment of this disclosure.

FIG. 4 is a side-view of a diaphragm according to another embodiment of this disclosure. According to another embodiment, in the diaphragm 310 of FIG. 4, Steps S303 and S304 are repeated once to form at least one third electret 319. Steps S303 and S304 may be repeated several times to form the third, fourth or fifth electret until the desirable layers of the electret composite film is reached. It is noted that one extra poling step is performed if the stacked layers of the electret(s) are increased. It is understood that the above described steps and poling processes may be repeated until the desirable layers of the electret composite film is reached.

Referring back to FIG. 3, after stacking the electrets, in Step S305, a polymer layer 118 is disposed on one side of the electret composite film that is opposite to the first electret 112. In this embodiment, the polymer layer 118 is also adhered to the electret composite film via the electrostatic force. In Step S306, the diaphragm 110 having the polymer layer 118 stacked thereon is poled again to form the diaphragm 110 as shown in FIG. 1A. In Step S307, a first spacer 130 and a first perforated electrode 120 are disposed on the polymer layer 118 of the diaphragm 110 to form the electret loudspeaker device 100. In Step S301, the electrode layer 116 is disposed on the first electret 112 by spray coating, spin coating, sputtering, evaporation, electroplating, screen printing or blade coating, for example. The material of the electrode layer may be gold, silver, aluminum, copper, chromium, platinum, indium-tin oxide (ITO), silver paste or carbon paste, for example.

In the previous steps, the diaphragm 110 stacked with the electrets 112, 114 and the polymer layer 118 may be poled by corona poling technique, for example. The mechanism of the corona poling technique is to utilize inhomogeneous electric field to induce partial breakdown and dissociation of air, ions and electrons being accelerated by the electric field and collided with each other to induce serial interaction, and dissociated charges are generated. The dissociated charges are accelerated by the electric field and implanted into the material surface. The longer period or higher voltage is applied, the surface implanted charges obtain more energy and have better chance to migrate into the electret, where the migrated charges are grasped and become permanent charges. The stored charges are largely space charges. The poling effects may be influenced by the poling voltage, temperature, humidity and applied period.

By using corona poling technique, higher surface charge density is achieved but the transversal uniformity of charge density and the stability of the charged charges are inferior, when compared with those obtained by using low energy electron beam bombardment. However, corona poling technique is still one of the most common poling techniques used in industry production, because the corona poling process can be operated through uncomplicated equipments and be performed straightforwardly. Nevertheless, the poling techniques applicable for this invention may not be limited to corona poling technique, and E-beam poling, thermal poling or radiation poling techniques may be the poling techniques included within the scope of this invention.

In summary, the electret loudspeaker device of this invention take advantage of the polymer layer disposed on the diaphragm constituted by stacking plural layers of electrets, so as to prevent the water vapor from invading into the diaphragm, which may deteriorate the characteristics of the electret loudspeaker device. In addition, additional protectors made of hydrophobic materials may be further arranged on the sides and top and bottom surfaces of the electret loudspeaker device to further baffle the moisture. For the fabrication method of the electret loudspeaker device, each layer or component of the diaphragm is attached through electrostatic force, which simplified the processes. The poling processes performed after stacking each one element or layer may further enhances the electret property stability of the electret loudspeaker device, so that the electret loudspeaker device may maintain the originally excellent advantages even operated under the environments of high humidity and high temperature.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electret loudspeaker device, comprising:
   a diaphragm, comprising:
      a first electret;
      a second electret, stacked on one side of the first electret, wherein at least one of the first electret and the second electret is made of a material comprising expanded polytetrafluoroethylene;
      an electrode layer, stacked on another side of the first electret that is opposite to the second electret; and
      a polymer layer being made of a hydrophobic material, wherein the second electret is sandwiched between the polymer layer and the first electret, and the first electret is sandwiched between the electrode layer and the second electret;
   a first spacer being made of an insulating material, wherein the first spacer is disposed between the diaphragm and the first perforated electrode, and supports the first perforated electrode over the diaphragm to define at least a first chamber; and
   at least one insulative fixture only penetrating the first spacer and the diaphragm, and covered by the first perforated electrode.

2. The electret loudspeaker device of claim 1, wherein the first electret is an expanded polytetrafluoroethylene membrane, while the second electret is a solid electret.

3. The electret loudspeaker device of claim 1, further comprising two terminal electrodes, wherein the two terminal electrodes are respectively electrically connected to the first perforated electrode and the diaphragm, and are electrically connected to an external signal.

4. The electret loudspeaker device of claim 1, further comprising:
   a supporter, stacked on the first perforated electrode; and
   a protector comprising a first surface protective layer and a plurality of side protective layers, wherein the first surface protective layer is stacked on the supporter and covers the first perforated electrode, the side protective layers are disposed on sides of the electret loudspeaker device, and the first surface protective layer and the side protective layers are made of hydrophobic materials.

5. The electret loudspeaker device of claim 1, further comprising:
   a second perforated electrode, stacked close to the electrode layer of the diaphragm; and
   a third spacer, disposed between the diaphragm and the second perforated electrode, and supports the second perforated electrode over the diaphragm to define at least a second chamber.

6. The electret loudspeaker device of claim 5, further comprising:
   a plurality of supporters, respectively stacked on the first perforated electrode and the second perforated electrode; and a protector, comprising a first surface protective layer, a second surface protective layer and a plurality of side protective layers, wherein the first surface protective layer and the second surface protective layer respectively are stacked on the supporters and cover the first perforated electrode and the second perforated electrode, the side protective layers are disposed on sides of the electret loudspeaker device, and the first surface protective layer, the second surface protective layer and the side protective layers are made of hydrophobic materials.

7. The electret loudspeaker device of claim 5, further comprising two terminal electrodes, wherein the two terminal electrodes are respectively electrically connected to two of the first perforated electrode, the second perforated electrode and the diaphragm.

8. The electret loudspeaker device of claim 1, wherein materials of the first electret and the second electret comprise at least one of polypropylene, polystyrene, polycarbonate, polyvinyl chloride, polymethylmethacrylate, cyclic olefin copolymers, polytetrafluoroethylene, expanded polytetrafluoroethylene (ePTFE), fluorinated ethylene propylene and the combinations thereof.

9. The electret loudspeaker device of claim 1, wherein a material of the polymer layer comprises at least one of polypropylene, polyethylene, poly ethylene terephthalate, polyvinyl chloride and the combinations thereof.

10. A fabrication method of an electret loudspeaker device, comprising:
   a. providing a first electret material layer, and disposing an electrode layer on one side of the first electret material layer;
   b. poling the first electret material layer having the electrode layer disposed thereon to form a first electret;
   c. disposing a second electret material layer on one side of the first electret that is opposite to the electrode layer via electrostatic force;
   d. poling the first electret having the second electret material layer adhered thereon, so that the poled second electret material layer becomes a second electret, wherein the electrode layer, the first electret and the second electret constitute an electret composite film;
   e. disposing a polymer layer on one side of the electret composite film that is opposite to the first electret, wherein the polymer layer is adhered to the second electret of the electret composite film via electrostatic force;
   f. poling the electret composite film having the polymer layer stacked thereon to form a diaphragm;
   g. disposing a first spacer and a first perforated electrode on the polymer layer of the diaphragm; and
   h. disposing at least one insulative fixture which only penetrates the first spacer and the diaphragm, and disposing the first perforated electrode on the first spacer, wherein the at least one insulative fixture is covered by the first perforated electrode.

11. The method of claim 10, further comprising forming at least one third electret, after the step of poling the first electret having the second electret material layer adhered thereon, so that the poled second electret material layer becomes the second electret, the step of forming the third electret comprising:
   disposing a third electret material layer on the electret composite film via electrostatic force; and
   poling the electret composite film with the third electret material layer thereon, so that the third electret material layer becomes the at least one third electret.

12. The method of claim 10, wherein materials of the first electret and the second electret comprise at least one of polypropylene, polystyrene, polycarbonate, polyvinyl chloride, polymethylmethacrylate, cyclic olefin copolymers, polytetrafluoroethylene, expanded polytetrafluoroethylene (ePTFE), fluorinated ethylene propylene and the combinations thereof.

13. The method of claim 10, wherein a material of the polymer layer comprises at least one of polypropylene, polyethylene, poly ethylene terephthalate, polyvinyl chloride and the combinations thereof.

* * * * *